US009088561B2

(12) United States Patent
Rogers et al.

(10) Patent No.: US 9,088,561 B2
(45) Date of Patent: Jul. 21, 2015

(54) METHOD AND SYSTEM FOR AUTHENTICATION IN A COMPUTER NETWORK

(75) Inventors: Tony Rogers, Rowville (AU); Christopher Betts, Richmond (AU)

(73) Assignee: CA, Inc., New York, NY (US)

( * ) Notice: Subject to any disclaimer, the term of this patent is extended or adjusted under 35 U.S.C. 154(b) by 2161 days.

(21) Appl. No.: 11/068,149

(22) Filed: Feb. 28, 2005

(65) Prior Publication Data

US 2006/0020793 A1    Jan. 26, 2006

Related U.S. Application Data

(63) Continuation of application No. 10/849,317, filed on May 19, 2004, now abandoned.

(51) Int. Cl.
*H04L 9/00* (2006.01)
*H04L 29/06* (2006.01)
*H04L 9/32* (2006.01)

(52) U.S. Cl.
CPC .......... *H04L 63/0807* (2013.01); *H04L 9/3228* (2013.01); *H04L 63/0838* (2013.01)

(58) Field of Classification Search
CPC ... H04L 63/08; H04L 63/0807; H04L 63/083; H04L 63/0838; H04L 63/0846; H04L 9/32; H04L 9/3226; H04L 9/3228; H04L 9/3236
USPC .................................. 713/185; 709/227–229
See application file for complete search history.

(56) References Cited

U.S. PATENT DOCUMENTS

| 6,263,437 | B1* | 7/2001 | Liao et al. ...................... 713/169 |
| 7,127,700 | B2* | 10/2006 | Large ............................. 717/100 |
| 7,178,163 | B2* | 2/2007 | Reeves, Jr. ........................ 726/2 |
| 7,574,511 | B2* | 8/2009 | Pujol et al. ..................... 709/229 |
| 7,603,469 | B2* | 10/2009 | Fletcher et al. ................ 709/229 |
| 2003/0135628 | A1* | 7/2003 | Fletcher et al. ................ 709/229 |
| 2003/0182364 | A1* | 9/2003 | Large et al. ..................... 709/203 |
| 2003/0182624 | A1* | 9/2003 | Large ............................. 715/513 |
| 2004/0039946 | A1* | 2/2004 | Smith et al. .................... 713/202 |
| 2004/0093515 | A1* | 5/2004 | Reeves, Jr. ..................... 713/201 |

(Continued)

FOREIGN PATENT DOCUMENTS

EP         0 938 209 A2    8/1999    ................. H04L 9/08

OTHER PUBLICATIONS

R. Fielding et al. "RFC 2616: Hypertext Transfer Protocol—HTTP/1.1" Published Jun. 1999. http://www.faqs.org/ftp/rfc/pdf/rfc2616.txt.pdf.*

(Continued)

*Primary Examiner* — Joseph P Hirl
*Assistant Examiner* — Thomas Gyorfi
(74) *Attorney, Agent, or Firm* — Baker Botts L.L.P.

(57) ABSTRACT

Method and system for authentication in a computer network is provided. A first message from a client to a server is transmitted, where the first message includes erroneous user information. In response to the first message, a second message is transmitted from the server to the client, where the second message includes an error message and a nonce. The client transmits a third message to the server in response to the second message, where the third message includes non-erroneous user information and the nonce. The server then provides authentication in response to the client's third message.

13 Claims, 4 Drawing Sheets

(56) References Cited

U.S. PATENT DOCUMENTS

| | | | | |
|---|---|---|---|---|
| 2004/0242329 | A1* | 12/2004 | Blackburn et al. | 463/42 |
| 2005/0188193 | A1* | 8/2005 | Kuehnel et al. | 713/155 |
| 2005/0204048 | A1* | 9/2005 | Pujol et al. | 709/229 |

OTHER PUBLICATIONS

J. Franks et al. "RFC 2617: HTTP Authentication: Basic and Digest Access Authentication" Published Jun. 1999 http://www.faqs.org/ftp/rfc/pdf/rfc2617.txt.pdf.*

A. Menezes et al. "Handbook of Applied Cryptography" © 1997 CRC Press LLC. (780 pages).*

David Gourley et al. "HTTP: The Definitive Guide, 1st Edition". Published Sep. 27, 2002 by O'Reilly Media. Excerpt from Chapter 13 (30 pages).*

SyncML Sync Protocol, version 1.1 Published Feb. 15, 2002 (62 pages) http://www.openmobilealliance.org/tech/affiliates/syncml/syncml_sync_protocol_v11_20020215.pdf.*

SyncML HTTP Binding version 1,1 Published Feb. 15, 2002 (20 pages) http://www.openmobilealliance.org/tech/affiliates/syncml/syncml_http_v11_20020215.pdf.*

Gourley, David et al. "HTTP: The Definitive Guide, 1st Edition" © 2002 O'Reilly Media Inc. Excerpt from chapter 13 (30 pages).*

Oasis UDDI Spec TC Technical Note: Modeling HTTP Access Authentication in UDDI. Reference dated Mar. 16, 2004. http://www.oasis-open.org/committees/download.php/7010/uddi-spec-tc-tn-htpauth-20040316.doc.*

R. Fielding et al. "RFC 2068: Hypertext Transfer Protocol—HTTP/1.1" Published Jan. 1997. http://www.faqs.org/ftp/rfc/pdf/rfc2068.txt.pdf.*

J. Franks et al. "RFC 2069: An Extension to HTTP: Digest Access Authentication" Published Jan. 1997. http://www.faqs.org/ftp/rfc/pdf/rfc2069.txt.pdf.*

UDDI Version 2.04 API Specification: UDDI Committee Specification, Jul. 19, 2002. (93 pages) http://uddi.org/pubs/ProgrammersAPI-V2.04-Published-20020719.pdf.*

"CPAN: UDDI::Lite—Library for UDDI clients in Perl" Published Nov. 6, 2003 as verified by the Internet Archive (6 pages) http://web.archive.org/web/20031106134403/http://search.cpan.org/dist/SOAP-Lite/lib/UDDI/Lite.pm.*

Source code for "Lite.pm" © 2000-2001 Paul Kulchenko (12 pages). Obtained from http://sourceforge.net/projects/soaplite/files/.*

"cvs commit: ws-juddi/samples/get_authToken GetAuthTokenSample.java" Published Mar. 22, 2004 (2 pages) http://marc.info/?l=juddi-cvs&m=113877627125768&w=2.*

Short, Scott. "Building XML Web Services for the Microsoft® .NET Platform" © 2002 Microsoft Press. Excerpt from Chapter 9 (pp. 186-209).*

PCT, Notification of Transmittal of the International Search Report and The Written Opinion of the International Searching Authority, dated Sep. 6, 2005 for International Application No. PCT/US2005/017465, 11 pages.

* cited by examiner

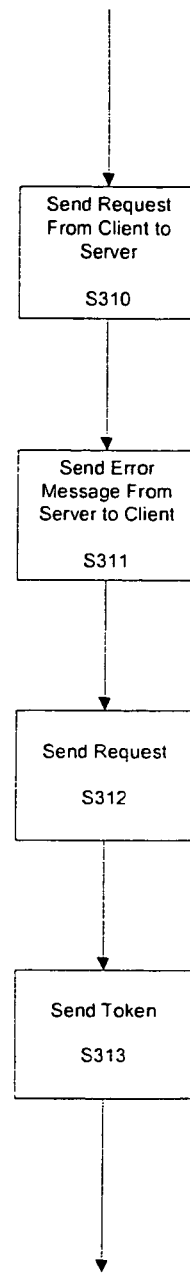

METHOD AND SYSTEM FOR AUTHENTICATION IN A COMPUTER NETWORK

This application is a Continuation of U.S. Ser. No. 10/849,317 filed May 19, 2004 now abandoned which is hereby incorporated by reference in its entirety, herein.

BACKGROUND

1. Technical Field

The present disclosure relates generally security and, more particularly, to a method and system for authentication in a computer network.

2. Description of the Related Art

Web services are automated resources that can be accessed by the Internet and provide a way for computers to communicate with one another. Web services use "Extensible Markup Language" (XML) to transmit data. XML is a human readable language that is used for tagging the data that is used by web services.

A computer system using web services can use a "Universal Discovery, Description and Integration" (UDDI) protocol. Computer system(s) as referred to herein may include(s) individual computers, servers, computing resources, and/or networks, etc. UDDI is a web based globally distributed directory that exposes information about service providers, service implementations, and service metadata. UDDI is similar to a phone book's yellow pages because it allows service providers, such as businesses, to advertise the services that they offer and allows service consumers to discover services that meet their needs.

The UDDI standard is fundamental to the newly emerging network of web services. Security efforts can be undertaken to prevent intruders from being able to access critical data that is exposed by UDDI. One way to attempt to provide security occurs at the network layer and utilizes a single username and a password combination from a user in order to gain access to critical data. However, the UDDI standard does not specify how the publication of data into a UDDI repository is to be done in a secure manner. This leaves a major security hole in the UDDI standard.

FIG. 2 shows an example of a type of authentication mechanism that uses an authentication token. An authentication token is a system that is used to identify a user in a computer system, such as a network. A client 201 transmits a request to a server 202 for an authentication token 204. The request contains a username and password 203. For example, the request can be carried out through a get_authToken Application Programming Interface (API) that obtains the authentication token from a UDDI enabled server 202. In response to the client's 201 request, the server 202 transmits the authentication token 204 to the client 201. The authentication token 204 may contain authentication information, allowing the client 201 to gain access to a UDDI repository which may be local to server 202 or remote therefrom.

However, such authentication mechanisms can be susceptible to attack and allow unauthorized users to take advantage of system vulnerabilities. For example, an unauthorized user, such as a hacker, would potentially need only one username and one password to gain access to critical data. Password sniffers can easily allow unauthorized users to collect these usernames and passwords, thereby compromising system security.

Accordingly, it would be beneficial to provide a reliable and effective authentication mechanism to ensure that the UDDI protocol can be used securely.

SUMMARY

A method of authentication in a computer network includes transmitting a first message from a client to a server, the first message comprising at least one of erroneous and incomplete user information, transmitting a second message from the server to the client, the second message comprising an error message and a nonce, transmitting a third message from the client to the server, the third message comprising non-erroneous and complete user information and the nonce, and providing authentication in response to the third message.

A system for authentication in a computer network, comprises a system for transmitting a first message from a client to a server, the first message comprising at least one of erroneous and incomplete user information, a system for transmitting a second message from the server to the client in response to the first message, the second message comprising an error message and a nonce, a system for transmitting a third message from the client to the server in response to the second message, the third message comprising non-erroneous and complete user information and the nonce and a system for transmitting authentication information from the server to the client in response to the third message.

A computer readable storage medium including computer executable code for authentication in a computer network, comprises code for transmitting a first message from a client to a server, the first message comprising at least one of erroneous and incomplete user information, code for transmitting a second message from the server to the client in response to the first message, the second message comprising an error message and a nonce, code for transmitting a third message from the client to the server in response to the second message, the third message comprising non-erroneous and complete user information and the nonce and code for providing authentication in response to the third message.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIGS. 3A and 3B show a schematic diagram and flow chart, respectively, for illustrating the challenge-response authentication mechanism, according to an embodiment of the present disclosure.

DETAILED DESCRIPTION

The present disclosure provides tools (in the form of methodologies, apparatuses, and systems) for authentication in a computer network. The tools may be embodied in one or more computer programs stored on a computer readable medium or program storage device and/or transmitted via a computer network or other transmission medium including a wireless transmission system.

The following exemplary embodiments are set forth to aid in an understanding of the subject matter of the present disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1:
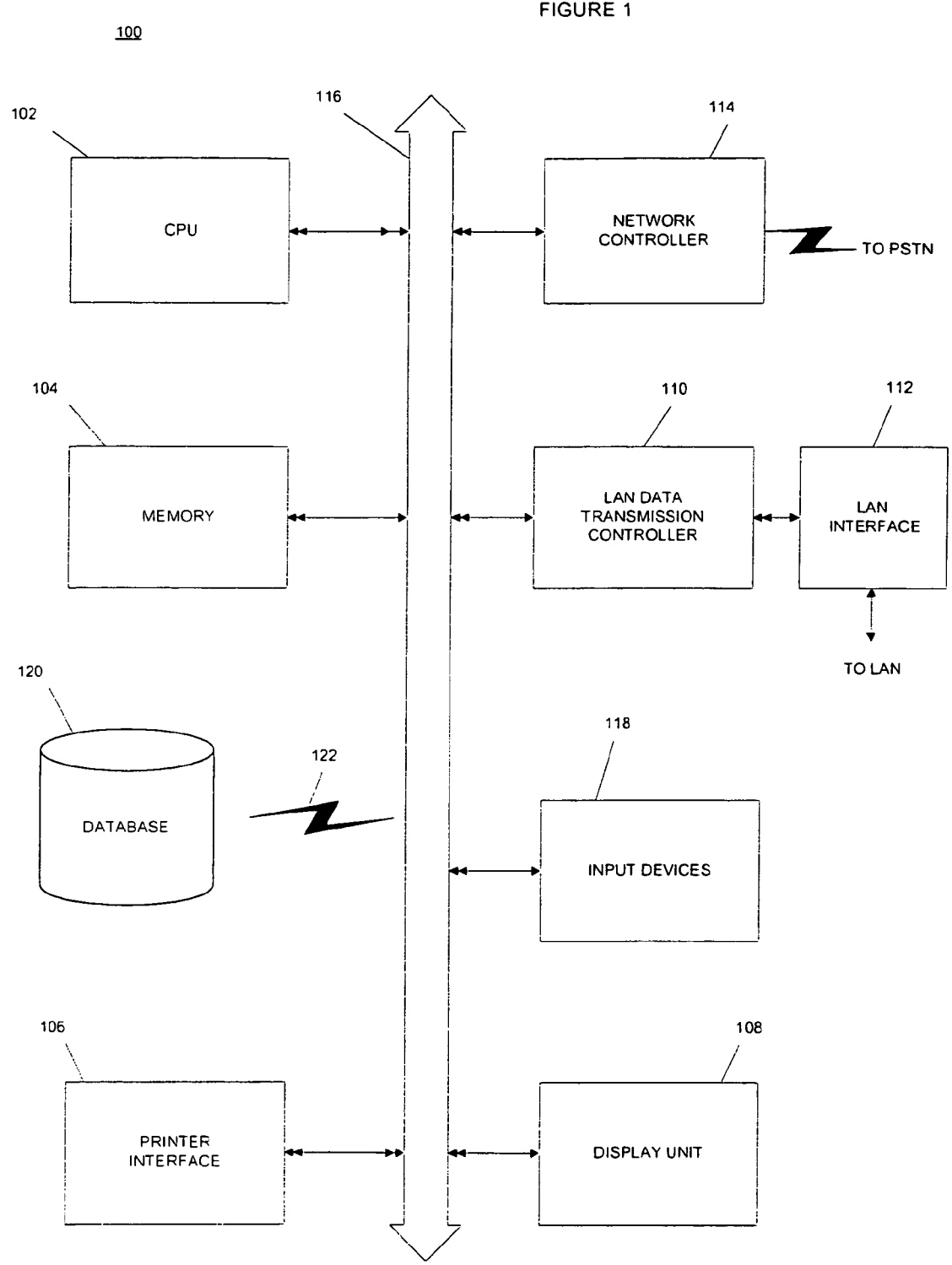
FIG. 1 shows a block diagram of an exemplary computer system capable of implementing the method and system of the present disclosure.
Figure 2:
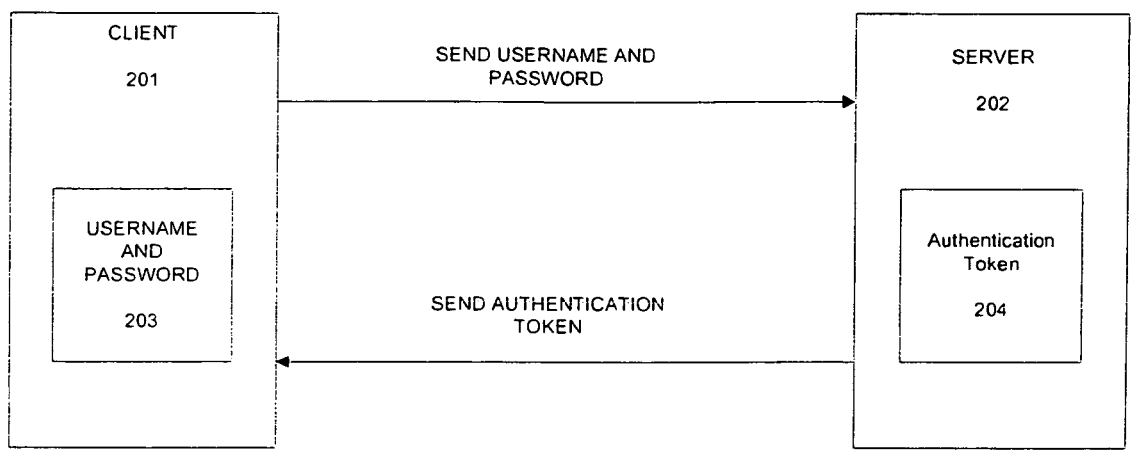
FIG. 2 shows a schematic diagram illustrating a background authentication mechanism.

FIG. 1 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The specific embodiments described herein are illustrative, and many variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Figure 3A:
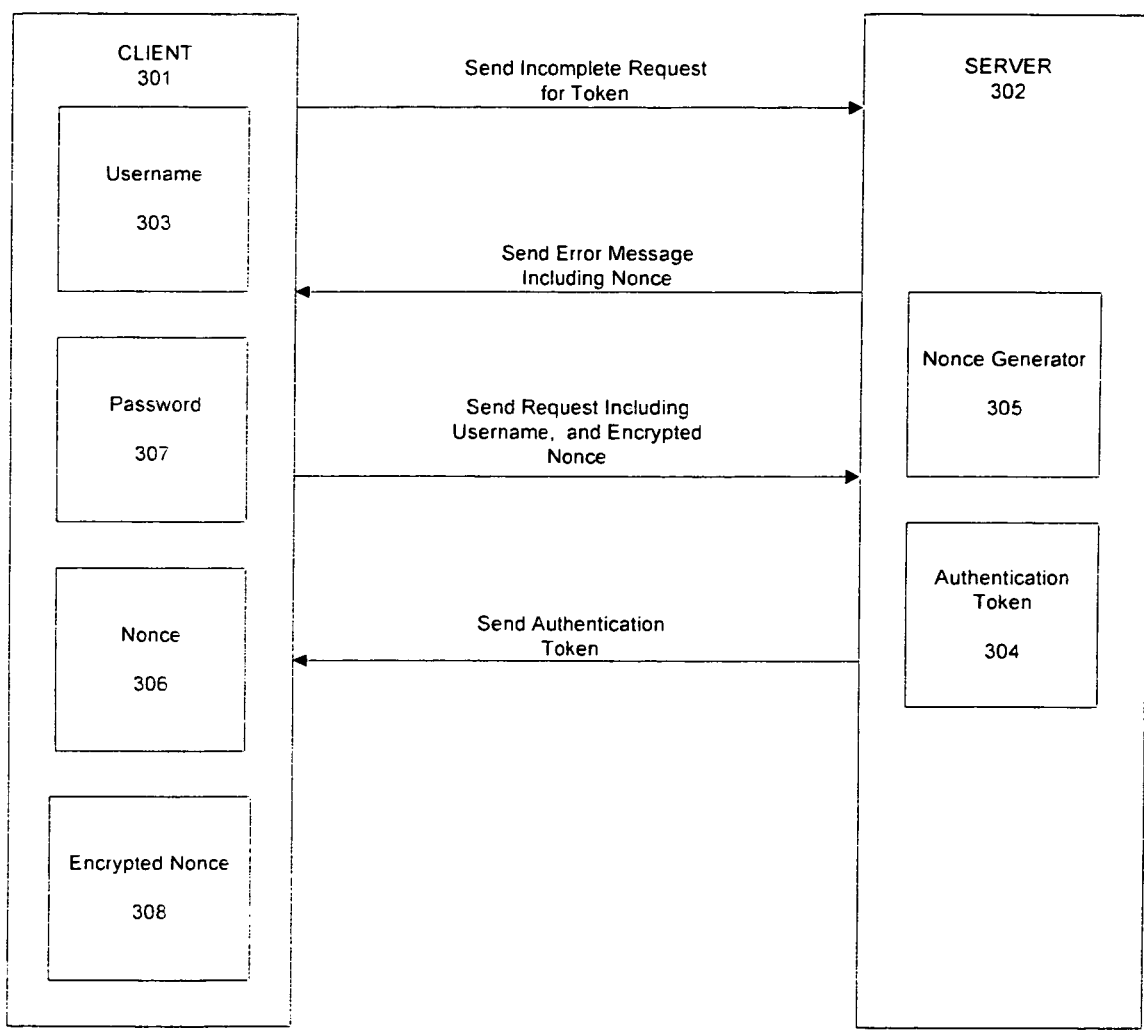

According to an embodiment of the present disclosure, a "challenge-response" authentication mechanism is utilized, where a user can prove their identity before accessing a computer network, such as, for example, a UDDI repository. FIGS. 3A and 3B are a schematic diagram and a flow chart illustrating the challenge-response authentication mechanism, according to an embodiment of the present disclosure. According to this embodiment, a user of client 301 sends a request to server 302 for an authentication token 304. In order to utilize the challenge-response techniques of the present disclosure, the request sent by the user is incomplete or erroneous. For example, the request can contain an incomplete, incorrect or missing password, username, etc. (Step S310). The request can be in the form of a first call to the get_authToken API. In response to this incomplete, incorrect or missing information, server 302 returns an error message or challenge asking client 301 for further verification information and containing a "nonce" (Step S311). A nonce is random data (e.g., random numbers, indicia, etc.) generated by nonce generator 305. Nonce generator 305 is capable of generating unique data for each request received by server 302. Upon receiving the error message or challenge from server 302, client 301 responds by encrypting nonce 306 with password 307 and sending authentication information including username 303 and encrypted nonce 308 (response) (Step S312). The authentication information may be sent to server 302 securely. For example, the username 303, and/or encrypted nonce 308 may be securely sent from client 301 to server 302 in order to prevent tampering by an unauthorized user. For example, the client may sign the random challenge (the nonce) using a Public Key Infrastructure (PKI) private key and include the signed challenge in a credential field of a second call to get_authToken API with correct username. Upon receiving the authentication information from client 301, server 302 transmits an authentication token 304 that contains authentication information to client 301 (Step S313).

According to embodiments of the present disclosure, the system an method utilize standard UDDI API calls, adding the security of a challenge-response protocol to provide a useful level of additional security over that provided by the UDDI standard alone. The system and method according to the present embodiments are compatible with any protocol being used in a computer system. For example, if a client that does not support the protocol being used sends an initial request to server 302 (e.g., missing a username or password), then server 302 will send back an error message including a nonce. The client can respond to the error message in a normal manner by sending a request that includes the missing information (e.g., the missing username or password) and completely ignore this nonce included in the error message. The present system and method are thus backward compatible.

Numerous additional modifications and variations of the present disclosure are possible in view of the above-teachings. It is therefore to be understood that within the scope of the appended claims, the present disclosure may be practiced other than as specifically described herein.

What is claimed is:

1. A method for authentication in a computer network, comprising:
    transmitting a get_authToken message from a Universal Discovery Description and Integration (UDDI) client to a UDDI server, the get_authToken message specified in a UDDI standard as a single interaction that does not include an explicit challenge-response request, the get_authToken message requesting authentication information from the server, the get_authToken message comprising user information with at least one error in the user information, the error provided by the UDDI client specifically to trigger a challenge-response exchange with the UDDI server to request the authentication information, the challenge-response exchange providing the security of multiple interactions with the UDDI server using a mechanism specified as a single interaction, the challenge-response exchange comprising:
    receiving a second message from the UDDI server in response to the get_authToken message, the second message comprising an error message and a nonce;
    encrypting the nonce;
    transmitting a second get_authToken message to the server in response to the second message, the second get_authToken message comprising non-erroneous and complete user information and the encrypted nonce; and
    receiving authentication information from the server in response to the second get_authToken message; and
    wherein the user information comprises user information with at least one username present and at least one missing password.

2. The method of claim 1, wherein the UDDI client had the non-erroneous and complete user information prior to transmitting the erroneous user information.

3. The method of claim 1, wherein the second get_authToken message includes the nonce which has been signed using a PKI private key.

4. The method of claim 1, wherein the authentication comprises an authentication token.

5. A system for authentication in a computer network, comprising:
- a system for transmitting a get_authToken message from a Universal Discovery Description and Integration (UDDI) client to a UDDI server, the get_authToken message specified in a UDDI standard as a single interaction that does not include an explicit challenge-response request, the get_authToken message requesting authentication information from the server, the get_authToken message comprising user information with at least one error in the user information, the error provided by the UDDI client specifically to trigger a challenge-response exchange with the UDDI server to request the authentication information, the challenge-response exchange providing the security of multiple interactions with the UDDI server using a mechanism specified as a single interaction, the challenge-response exchange comprising:
  - a system for receiving a second message from the UDDI server in response to the get_authToken message, the second message comprising an error message and a nonce;
  - a system for encrypting the nonce;
  - a system for transmitting a second get_authToken message to the server in response to the second message, the second get_authToken message comprising non-erroneous and complete user information and the encrypted nonce; and
  - a system for receiving authentication information from the server in response to the second get_authToken message; and
- wherein the user information comprises user information with at least one username present and at least one missing password.

6. The system of claim 5, wherein the UDDI client had the non-erroneous and complete user information prior to transmitting the erroneous user information.

7. The system of claim 5, wherein the third message includes the nonce which is signed using a PKI private key.

8. The system of claim 5, wherein the authentication comprises an authentication token.

9. A computer readable storage medium including computer executable code for authentication in a computer network, comprising:
- code for transmitting a get_authToken message from a Universal Discovery Description and Integration (UDDI) client to a UDDI server, the get_authToken message specified in a UDDI standard as a single interaction that does not include an explicit challenge-response request, the get_authToken message requesting authentication information from the server, the get_authToken message comprising user information with at least one error in the user information, the error provided by the UDDI client specifically to trigger a challenge-response exchange with the UDDI server to request the authentication information, the challenge-response exchange providing the security of multiple interactions with the UDDI server using a mechanism specified as a single interaction, the challenge-response exchange comprising:
  - code for receiving a second message from the UDDI server in response to the get_authToken message, the second message comprising an error message and a nonce;
  - code for encrypting the nonce;
  - code for transmitting a second get_authToken message to the server in response to the second message, the second get_authToken message comprising non-erroneous and complete user information and the encrypted nonce; and
  - code for receiving authentication information from the server in response to the second get_authToken message; and
- wherein the user information comprises user information with at least one username present and at least one missing password.

10. The computer readable storage medium of claim 9, wherein the UDDI client had the non-erroneous and complete user information prior to transmitting the erroneous user information.

11. The computer readable storage medium of claim 9, wherein the third message includes the nonce which is signed using a PKI private key.

12. The computer readable storage medium of claim 9, wherein the authentication comprises an authentication token.

13. A method for authentication in a computer network, comprising:
- receiving correct user information;
- transmitting to a UDDI server a first message requesting authentication information from the server, the first message comprising user information with at least one error in the user information provided by a client, the error provided by the client specifically to trigger a challenge-response exchange with the UDDI server to request the authentication information, the challenge-response exchange comprising:
- receiving a second message from the UDDI server in response to the first message, the second message comprising an error message and a nonce;
- encrypting the nonce;
- transmitting a third message to the server in response to the second message, the third message comprising non-erroneous and complete user information and the encrypted nonce; and
- receiving authentication information from the server in response to the third message; and
- wherein the user information comprises user information with at least one username present and at least one missing password.

* * * * *